United States Patent [19]
Milligan et al.

[11] 3,917,453
[45] Nov. 4, 1975

[54] METHOD AND DEVICE FOR DETERMINING THE CONCENTRATION OF A SUBSTANCE IN A FLUID

[75] Inventors: Terry W. Milligan, Belmont; Richard F. Wright, Acton, both of Mass.

[73] Assignee: Polaroid corporation, Cambridge, Mass.

[22] Filed: Aug. 16, 1974

[21] Appl. No.: 498,021

[52] U.S. Cl. .......... 23/230 B; 23/253 TP; 195/103.5
[51] Int. Cl.² .............. G01N 31/14; G01N 31/22; G01N 33/16
[58] Field of Search .................... 23/230 B, 253 TP; 195/103.5; 116/114 AM

[56] References Cited
UNITED STATES PATENTS

| | | |
|---|---|---|
| 2,687,041 | 8/1954 | Anderegg .......................... 23/253 TP |
| 2,785,057 | 3/1957 | Schwab et al .................... 23/253 TP |
| 3,036,894 | 5/1962 | Forestiere ......................... 23/230 B |
| 3,232,710 | 2/1966 | Rieckmann et al. ............ 23/253 TP |
| 3,418,083 | 12/1968 | Rey et al ......................... 23/253 TP |
| 3,510,263 | 5/1970 | Hach ............................... 23/255 TP |
| 3,552,928 | 1/1971 | Fetter ............................... 195/103.5 |

Primary Examiner—Robert M. Reese
Attorney, Agent, or Firm—Philip G. Kiely

[57] ABSTRACT

A diagnostic test device comprising an absorbent medium and a reaction zone located between superposed sheets. The fluid containing the substance to be analyzed is placed on the absorbent medium. Compressive force is applied to the absorbent medium providing a predetermined quantity of fluid to the reaction zone where reagents are located to react with the substance to provide a colorimetric determination of the presence and/or concentration of the substance.

10 Claims, 3 Drawing Figures

METHOD AND DEVICE FOR DETERMINING THE CONCENTRATION OF A SUBSTANCE IN A FLUID

BACKGROUND OF THE INVENTION

A variety of devices are known today for analysis of body fluids such as urine, blood, etc. Such devices generally employ extremely accurate procedures and provide a valuable diagnostic tool. However, most such devices are expensive, require trained personnel and involve timeconsuming techniques. Obviously, such devices are unavailable for use by a layman in, for example, daily monitoring of a diabetic condition.

To fill this very important need a number of relatively simple devices and test strips have been developed and marketed. Many of the so-called simple devices developed for use by untrained personnel suffer from a variety of deficiencies. Accuracy, the ability of the operator to discern relatively minor changes and ease of use are some of the problems encountered with such prior art devices.

It is an object of the present invention to provide techniques and devices not susceptible to the deficiencies of the prior art.

SUMMARY OF THE PRESENT INVENTION

The present invention is directed to a relatively simple diagnostic test device for use in analyzing a substance contained in a body fluid. In accordance with the present invention, a fluid, such as urine, containing the substance to be analyzed, is disposed in an absorbent medium. A predetermined quantity is discharged from the absorbent medium between two superposed sheets having appropriate reagents on one or both sheets. The predetermined quantity is provided by applying a specified amount of pressure to the absorbent medium and further controlled by maintaining a specific spacing between the superposed sheets. At least one of the sheets is transparent to permit observation of the qualitative or quantitative determination being carried out.

After the measured amount of fluid is disposed between the superposed sheets, the substance reacts with appropriate reagents to provide a visual determination (observed through the transparent sheet) of the qualitative and/or quantitative presence of the substance.

DETAILED DESCRIPTION OF THE INVENTION

Figure 1:
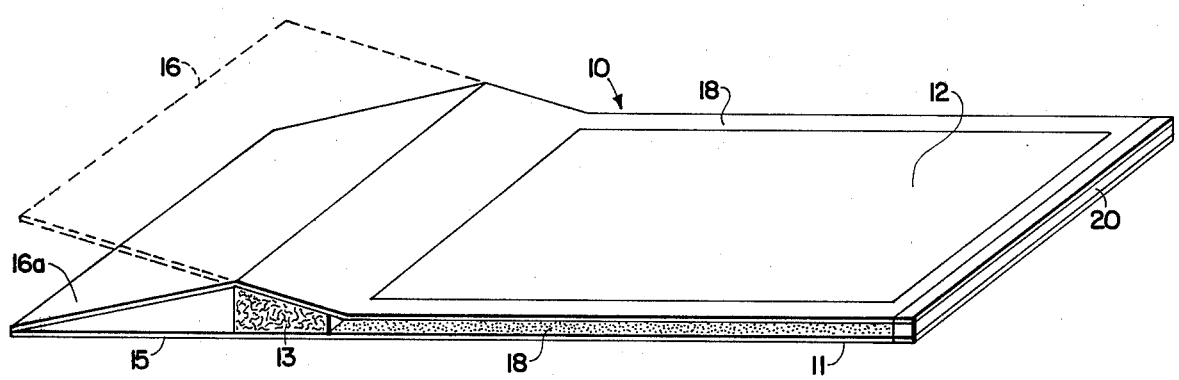
FIG. 1 is a perspective view of the testing device of the present invention.

The present invention is directed to a method and a device useful in said method for qualitative and/or quantitative determination of substances, particularly substances in body fluids. Thus, by means of the present invention, analysis of substances in blood, urine, etc., can be carried out quickly and easily without the need of trained personnel to provide an accurate measure of the substance under consideration in a body fluid.

The novel device of the present invention comprises two superposed sheets retaining an absorbing, fluid receiving zone therebetween. At least one sheet is transparent and at least one sheet has a suitable indicator or reagent retained on the inner surface to provide the determination of the substance under test. A predetermined quantity of fluid is disposed between the sheets from the fluid receiving zone to a second zone where it reacts with the reagents retained therein, providing a visual determination of the substance. The visual determination, generally a colorimetric determination, is viewed through the transparent sheet and compared against a standard scale, either attached to the test device or separate therefrom. By matching the color of the test device with the scale an accurate determination is readily available. The test device may then be discarded.

To describe the operation of the diagnostic test device in more detail, the operator will lift a portion of one of the two sheets exposing the absorbent, fluid receiving zone. To permit access to the fluid receiving zone, it is preferred that a portion of the two sheets not be joined at the edges or at the end adjacent to the fluid receiving zone. To avoid leakage from the sides during expulsion of the fluid from the fluid receiving zone, an adhesive may be employed along the open edges and end of the sheets which is activated by the application of compressive force which will be described below.

In still another alternate embodiment, only one end is open permitting access to the fluid receiving zone.

Upon exposing the fluid receiving zone, the operator will place the fluid containing the substance to be tested on the absorbent material. It is not necessary to apply a measured amount of fluid; it is only necessary that the absorbent medium be saturated. Subsequent operation of the fluid test device will accurately measure the amount of fluid to be contacted with the reagents.

The superposed sheets are then moved relative to and between a pair of juxtaposed members. These members may comprise a pair of substantially parallel rollers, a roller and a plate or any other apparatus that will, as the sheets are moved through it, force the fluid between the superposed sheets as a mass extending transversely across the sheets so as to produce a predetermined, uniform fluid layer over the desired portion of the superposed sheets. By maintaining a specific gap between the juxtaposed pressure-applying members, fluid will be discharged from the absorbent material and an accurate amount disposed and retained in the test area between the sheets. Excess fluid will be retained in the absorbent material to some degree and excess will pass through the reagent containing area.

By extending the length of the sheets beyond the test area sufficiently no excess will spill out the end. Alternatively, absorbent trap means may be provided at the trailing end of the sheets to take care of any excess.

To avoid spillage and maintain the proper amount of fluid in the test area, it is preferred that the edges of the sheets adjacent the test area be sealed. The sheets are preferably sealed during manufacture of the test device, but may be sealed during application of pressure during movement through the juxtaposed members, employing suitable adhesive means, such as a fluid activated adhesive, a pressure sensitive adhesive or a Velcro fastener along the edges. In still another embodiment, the edges may contain spacing means or rails to more accurately control the space between the sheets in the test area, thereby controlling the quantity of fluid.

The test reagents which are adapted to react with the substance being tested for are disposed intermediate the two superposed sheets either by coating directly on the sheets or by incorporating them into a suitable carrier or binder material.

The substance in the fluid undergoes one or more reactions with the reagents which provide a colorimetric determination of the substance in the fluid, which is viewed through the transparent sheet and, if desired, compared with a suitable scale which may comprise a portion of the test device. Preferably, the reactants comprise enzymes and coenzymes and a colorimetric indicator. Many such systems are known to the art.

Turning now to the drawings, FIG. 1 is a perspective view of one embodiment of the present invention. Test device 10 is composed of first sheet 11 and second sheet 12 in superposed relationship retaining absorbent material 13 therebetween. Test device 10 is shown ready to receive a fluid for analysis wherein leading end portion 15 of first sheet 11 and leading end portion 16 of second sheet 12 are separated to permit access to absorbent material 13 which, as shown, is a sponge material. Edge portions 18 include sealing means such as binding tape to insure structural integrity of the device and to maintain the fluid within the desired area for reaction. Such edge portions will also prevent leakage of the fluid during and subsequent to processing. Edge portions 18 also include spacing means adapted to contact the pressure-applying members and ensure the distribution of the proper amount of fluid within the test area.

Any excess fluid is entrapped at the trailing end of device 10 by trap 20 which is composed of suitable absorbent material or voids.

Figure 3:
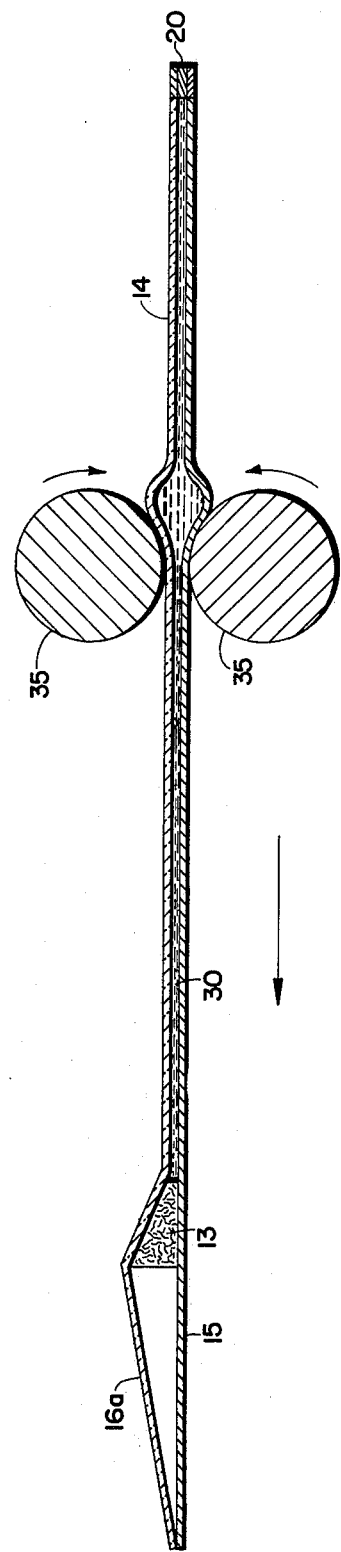
FIG. 3 is an enlarged cross-sectional view of the device of FIG. 1 during operation.

In operation, as shown in the enlarged cross-sectional view of FIG. 3, the fluid is applied to absorbent material 13 between leading portions 15 and 16. Leading portion 16 is moved to position 16a and device 10 is then inserted between suitable pressure-applying members, e.g., spaced apart rollers 35, and moved in the direction of the arrow. The compressive pressure of the rollers squeezes fluid 30 from the absorbent means and disposes it in the test area intermediate sheets 11 and 12 in the area substantially defined by window 14 in sheet 12. There the substance to be tested for reacts with the reagents disposed therein providing the above-described colorimetric determination.

Figure 2:
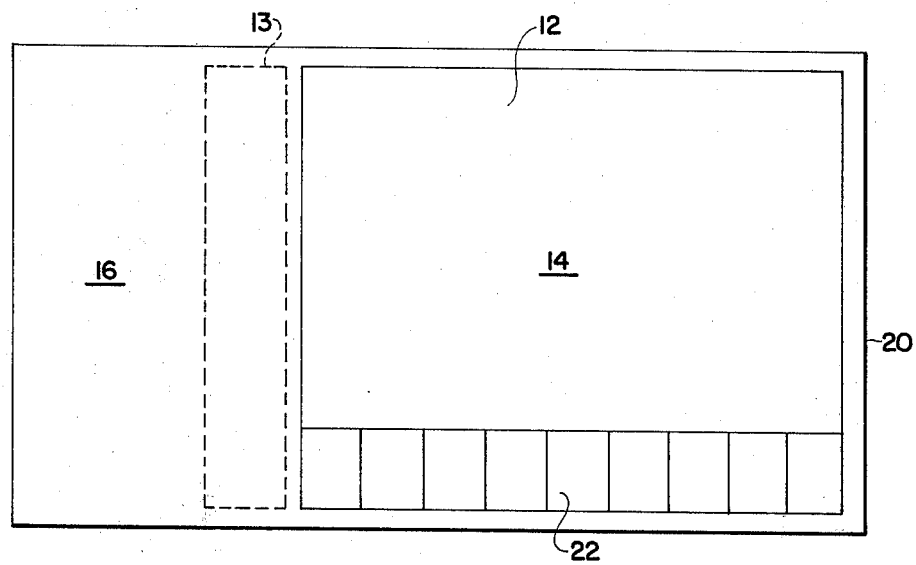
FIG. 2 is a top view of the device of FIG. 1 subsequent to processing.

FIG. 2 is a top view of a test device of the type shown in FIG. 1 but which further shows a test strip 22 on second sheet 12 adjacent window 14. Test strip 22 comprises permanent color gradations corresponding to concentrations of the substance being analyzed. Thus, the operator can immediately and conveniently obtain a numerical determination of the concentration of the substance avoiding delay or any fading or deterioration of the thus-produced colored reaction product.

The absorbent means may comprise any suitable material adapted to retain fluid and also which will give up the fluid under compressive force. Thus, cloth, sponge, polymeric open cell foams, microporous filters and the like may be employed.

It may be desirable to remove some components of the fluid prior to contacting the fluid with the reactants. Such components may be removed by interposing a filter between the absorbent means and the test area, or prior to the absorbent means. Alternatively, precipitants may be employed in the absorbent means itself. Protein is one example of a component of the fluid that may be removed prior to the reaction.

The sheets which comprise the walls of the device are preferably transparent and may be composed of any suitable material which will retain the reactants without leakage or without interfering with the reaction.

As stated above, the novel device of the present invention may be employed for a variety of diagnostic tests. For example, hemoglobin in blood may be ascertained by application of a blood sample to the absorbent material and disposing an oxidizing agent and a suitable indicator intermediate the superposed sheets. Suitable indicators are known to the art for such a test.

The novel test device of the present invention is particularly suitable for the enzymatic analysis of glucose in body fluids. The test for glucose is based on the following reaction sequence:

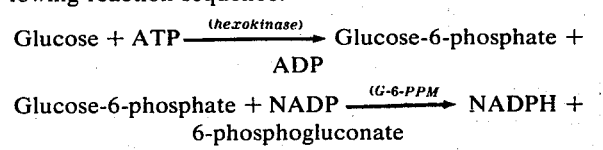

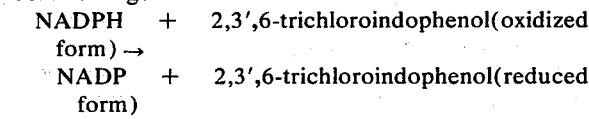

The absorption of NADPH at 340 nm is a measure of the glucose content in the sample fluid. Since 340 nm is beyond the visible region of the electromagnetic spectrum, a suitable indicator may be included in the system which will react with NADPH to give a suitable color change.

NADPH + 2,3',6-trichloroindophenol(oxidized form) →

NADP + 2,3',6-trichloroindophenol(reduced form)

ATP = Adenosine triphosphate
ADP = Adenosine diphosphate
NADP = Nicotinamide adenine dinucleotide phosphate
NADPH = Nicotinamide adenine dinucleotide phosphate reduced
G-6-PDH = Glucose-6-phosphate dehydrogenase The body fluid containing the glucose would be applied to the absorbent material. The reactants, ADP, NADP and a colorimetric indicator, would be located intermediate the sheets, preferably coated thereon. Suitable indicators include methylene blue, the sodium salt of 3'-chloroindophenol, the sodium salt of 2,3',6-trichloroindophenol and the sodium salt of 2,6-dichloroindophenol. It may be desirable to apply suitable time delay layers, e.g., polymeric layers of specific solubility or permeability, to one or more of the reactants to ensure the order of reaction. The color generated by the reaction will be compared visually with suitable color reference standards.

If the fluid to be analyzed contains a reducing substance (e.g., ascorbic acid in urine), it is preferred to employe a colorimetric indicator system that does not rely on a redox system to avoid any interference in the determination or inaccurate readings. For example, in a glucose determination a suitable indicator system may comprise a ferric salt, such as ferric nitrate coated on silica gel. A ferric-NADH salt is formed which is purple. While the thus-formed colorimetric determination is suitable for the aforementioned glucose determination, if a permanent record of the test is desired then 1,10-phenanthroline or 4,7-diphenyl-1,10-phenanthroline also coated on the silica gel will provide a pink, permanent colorimetric indication.

In a preferred embodiment, the ATP and NADP and/or enzymes would be applied to one surface of sheet 11 in the reaction zone and the colorimetric indicator would be coated on the inner surface of transparent window 14. The ATP and NADP and/or enzymes may be disposed in the reaction zone just prior to application of the fluid to be tested. However, in a particularly preferred embodiment, the enzyme and/or coenzyme is in a stable, immobilized state which, upon contact with the fluid to be tested, is activated.

In still another embodiment, in addition to the above-mentioned time delay layers, the reactants may be disposed in a suitable polymeric material and a layer of such a material cast on a surface in the reaction zone.

It is also known to bind enzymes to polymeric matrices. For example, in a cross-linked dextrose gel, adjacent hydroxyl groups can react with cyanogen bromide and then combine with amino groups of the enzyme. Other systems for incorporating enzymes into the matrix of a polymer are also known.

In an alternative embodiment, a mordant for the colored moiety produced in the present invention is employed. This would provide a degree of immobility to the colored species rendering the visual comparison more effective and accurate and still further lessening time of examination as a factor. The use of a mordant would also minimize any reversible reaction which might lead to inaccuracy in the determination. Mordants are well known to the art for a variety of colored materials and the particular mordant will be selected with the particular colored material in mind.

As stated above, the novel device of the present invention is suitable for use in a variety of diagnostic tests. In the following table, representative substances to be analyzed are indicated with examples of specific enzymes required for the determination.

| Substance | Enzymes |
| --- | --- |
| Glucose | Hexokinase |
|  | Glucose-6-phosphate dehydrogenase |
| Alcohol | Alcohol dehydrogenase |
| Triglycerides | Glycerol kinase |
|  | Pyruvate kinase |
|  | Lactate dehydrogenase |
| Blood urea nitrogen | Urease |
|  | l-glutarate dehydrogenase |
| Aldolase | Triosephosphate isomerase |
| Creatine phosphokinase | Glyceraldehyde-3-phosphate dehydrogenase (GDH) |
|  | Hexokinase |
|  | Glucose-6-phosphate dehydrogenase |
| Glutamate-oxalacetate transaminase | Malate dehydrogenase |

What is claimed is:

1. A method for determining the concentration of a substance in a fluid which comprises:
   disposing said fluid onto absorbent fluid receiving means disposed intermediate a first and second sheet in superposed relationship;
   subjecting said absorbent fluid receiving means to sufficient compressive force to discharge at least a portion of said fluid from said absorbent fluid receiving means into contact with reagents disposed intermediate said first and second sheets, said reagents adapted to react with said substance to provide a visual indication of the concentration of said substance.

2. The method of claim 1 wherein said absorbent fluid means comprises a sponge.

3. The method of claim 1 wherein said absorbent fluid means comprises a microporous filter.

4. The method of claim 1 which includes the step of removing undesirable components from said fluid prior to contacting said reagents with said fluid.

5. The method of claim 1 wherein said reagents comprise enzymes, coenzymes and colorimetric indicators.

6. The method of claim 5 wherein said enzymes and coenzymes are disposed on one of said sheets and said colorimetric indicator is disposed on the other of said sheets.

7. The method of claim 1 wherein at least one of said first and second sheets is transparent.

8. The method of claim 7 wherein one of said transparent sheets includes a colored scale indicating concentration standards for said substance.

9. The method of claim 1 wherein said fluid comprises blood.

10. The method of claim 9 wherein said reactants comprise hexokinase, glucose-6-phosphate dehydrogenase, and nicotinamide adenine dinucleotide phosphate and adenosine triphosphate.

* * * * *